United States Patent [19]
Davis

[11] Patent Number: 5,845,202
[45] Date of Patent: Dec. 1, 1998

[54] METHOD AND APPARATUS FOR ACKNOWLEDGE BACK SIGNALING USING A RADIO TELEPHONE SYSTEM

[75] Inventor: Walter Lee Davis, Parkland, Fla.

[73] Assignee: Motorola, Inc., Schaumburg, Ill.

[21] Appl. No.: 723,398

[22] Filed: Sep. 30, 1996

Related U.S. Application Data

[63] Continuation-in-part of Ser. No. 573,907, Dec. 18, 1995, abandoned, which is a continuation of Ser. No. 263,495, Jun. 20, 1994, abandoned, which is a continuation of Ser. No. 982,325, Nov. 27, 1992, abandoned.

[51] Int. Cl.$^6$ ....................................................... H04Q 7/12
[52] U.S. Cl. .......................... 455/412; 455/426; 455/38.1
[58] Field of Search .................................... 455/412, 413, 455/426, 556, 38.1; 340/825.44

[56] References Cited

U.S. PATENT DOCUMENTS

| | | | |
|---|---|---|---|
| 4,247,908 | 1/1981 | Lockhart et al. | 364/900 |
| 4,661,972 | 4/1987 | Kai | 379/57 |
| 4,747,122 | 5/1988 | Bhagat et al. | 379/57 |
| 4,748,655 | 5/1988 | Thrower et al. | 379/60 |
| 4,882,579 | 11/1989 | Siwiak | 340/825.44 |
| 5,054,052 | 10/1991 | Nonami | 379/57 |
| 5,117,449 | 5/1992 | Metroka et al. | 379/58 |
| 5,124,698 | 6/1992 | Mustonen | 340/825.44 |
| 5,148,473 | 9/1992 | Freeland et al. | 379/59 |
| 5,150,110 | 9/1992 | Breeden | 340/825.44 |
| 5,153,902 | 10/1992 | Buhl et al. | 379/57 |
| 5,153,903 | 10/1992 | Eastmond et al. | 379/57 |
| 5,168,502 | 12/1992 | Millet | 371/32 |
| 5,175,758 | 12/1992 | Levanto et al. | 379/57 |
| 5,189,413 | 2/1993 | Gaskill et al. | 340/825.44 |
| 5,202,912 | 4/1993 | Breeden et al. | 379/57 |
| 5,307,399 | 4/1994 | Dai et al. | 379/57 |
| 5,363,426 | 11/1994 | Nyhart | 379/57 |
| 5,392,452 | 2/1995 | Davis | 455/38.1 |
| 5,430,790 | 7/1995 | Williams | 379/63 |
| 5,444,438 | 8/1995 | Goldberg | 340/825.44 |

FOREIGN PATENT DOCUMENTS

| | | | |
|---|---|---|---|
| 0 212 761 (A2) | 3/1987 | European Pat. Off. | H04Q 7/04 |
| 0 263 666 (A2) | 4/1988 | European Pat. Off. | H04M 1/72 |
| 63-224422 (A) | 9/1988 | Japan | H04B 7/26 |

*Primary Examiner*—Andrew M. Dolinar
*Attorney, Agent, or Firm*—Pablo Meles

[57] ABSTRACT

A combination radio/telephone transceiver (40) receives a selective call signal over a selective call channel and searches for its assigned address (415). When the assigned address (415) is found, a message (405) associated therewith is decoded and stored, and the signal is further examined to determine whether the message (405) has been flagged for acknowledgment, such as by appending a predetermined ackback flag (425) or a predetermined ack address to the address (415) assigned to the combination radio/telephone transceiver (40). When no acknowledgment is requested, i.e., when the message (405) has not been flagged for acknowledgment, the combination radio/telephone transceiver (40) does not acknowledge reception of the message (405). When the message (405) is flagged for acknowledgment, the combination radio/telephone transceiver (40) acknowledges reception of the message (405) via a telephone network rather than over the selective call channel.

19 Claims, 5 Drawing Sheets

450

METHOD AND APPARATUS FOR ACKNOWLEDGE BACK SIGNALING USING A RADIO TELEPHONE SYSTEM

RELATED APPLICATIONS

This application is a continuation-in-part of Ser. No. 08/573,907 filed Dec. 18, 1995 by Davis, now abandoned entitled "SELECTIVE CALL MESSAGING SYSTEM WITH ACKNOWLEDGE BACK SIGNALING USING A RADIO TELEPHONE SYSTEM", which is a continuation of Ser. No. 08/263,495 filed Jun. 20, 1994, now abandoned, which was a continuation of Ser. No. 07/982,325 filed Nov. 27, 1992, now abandoned.

FIELD OF THE INVENTION

This invention relates in general to a combination selective call messaging system and radio telephone system, and in particular to a method and apparatus for messaging with acknowledge back signaling utilizing a radio telephone system.

BACKGROUND OF THE INVENTION

Selective call signaling systems (e.g., paging systems) generally provide one-way radio frequency (RF) communication of selective call messages, sometimes called pages, from a message originator to a selective call receiver. The message originator contacts the selective call system via the public switched telephone network system or other input interface means and provides the message information to a selective call, or paging, terminal. The message information is encoded into a conventional signaling protocol, modulated onto a carrier signal, and transmitted as an RF signal to the selective call receiver. The receiver receives the signal, demodulates and decodes the signal to recover the message, and presents the message to the system subscriber who is the user of the receiver.

Since selective call signaling is conventionally a one-way communication system, the message originator is typically unaware of whether the subscriber receives a message. Acknowledge back (ack-back) signaling has been developed to inform the system of the reception of a message by a receiver. Yet, to avoid interference between the messaging signals and the ack-back signals, either a communications path or system air time must be reserved for the ack-back signals. Air time is a precious commodity in selective call signaling systems, particularly a wide area messaging system with numerous subscribers. A selective call system service provider wishes to provide service for a large number of subscribers in order to obtain high revenue. Therefore, it is desirable that air time not be reserved for ack-back signals.

Since conventional selective call signaling systems are usually one-way signaling systems, an ack-back communications path would involve costly investment by the service provider to construct a communications path devoted to ack-back signaling. Additionally, ack-back signals are infrequent and typically require little air time. Therefore, a devoted communications path would be inefficient and could not provide the service provider a sufficient monetary return for the added feature of ack-back.

Thus, what is needed is an ack-back signaling system that does not take air time from the transmission of messages to selective call receivers and that does not require a devoted communications path.

DETAILED DESCRIPTION OF THE INVENTION

Figure 1:
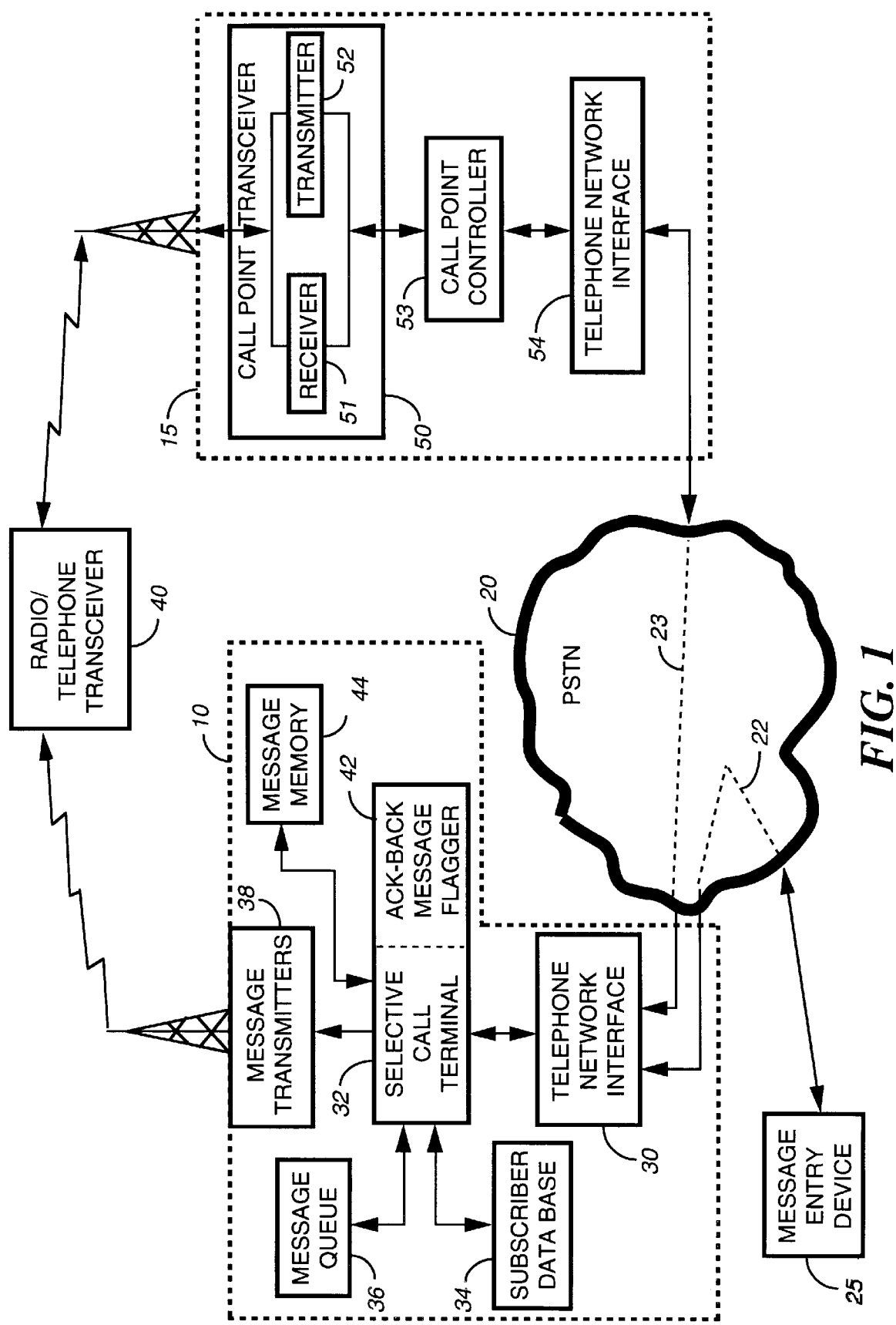
FIG. 1 is a diagram of a combination selective call messaging system and cordless telephone system in accordance with a preferred embodiment of the present invention.

Referring to FIG. 1, a selective call signaling system combining a wide area messaging system 10 and a radio telephone system, such as a cordless telephone system 15, uses the public switched telephone network (PSTN) 20 for communication therebetween. A preferred embodiment of the present invention utilizes a second generation cordless telephone (CT-2) system, which is a less expensive alternative to other radio telephone systems, such as cellular telephone systems. A message originator utilizes a message entry device 25 to enter message information via the PSTN 20 for encoding and transmission to a subscriber of the messaging system 10.

Typically, the message entry device 25 is a telephone for entry of voice or numeric information. The message entry device 25 could also comprise a data processing device, such as a computer terminal, for generation of message information comprising graphics, facsimile, or alphanumeric information.

The message originator initiates a message transmission sequence via the message entry device 25 by entering a voice or data message in the form of a call to the system access number of the specific message receiving device (such as a combination radio/telephone transceiver 40) to be called. The message originator is coupled to a selective call terminal 32 via a telephone network interface 30 of the messaging system 10 and PSTN path 22. When the incoming call is answered by the selective call terminal 32, a pre-recorded message is played that welcomes the message originator to the system 10 and describes how the originator can enter a message, e.g., a page, and request an optional acknowledgment that the message was received by the receiving device, such as the combination radio/telephone transceiver 40. The originator then responds by entering a voice or data message and a special code signal to indicate that an acknowledgment of successful reception of the message is desired.

In the selective call terminal 32, the message is initially entered in a buffer memory 44 for temporarily storing messages. Then, after the originator has ended the message entry sequence, the terminal 32 accesses a subscriber database 34 to obtain a subscriber address to associate with the message information to form a selective call message. In accordance with the present invention, if the originator has entered the special code signal indicating an acknowledgment is desired, an acknowledge-back (ack-back) message flagger portion 42 of the terminal 32 flags the message, and the terminal 32 places the flagged message into the messaging system queue 36 for later transmission. The ack-back flagger 42 can, for example, flag the message by using an address that is reserved for messages with acknowledge requests, or it can attach an acknowledgment request flag to a general addressing functional portion of the message containing a distinct address associated with the receiving device. When an address that is reserved for messages to be acknowledged is used, the "ack" address can be appended to the subscriber address that is unique to the receiving device.

The messages stored in the message queue 36 are retrieved sequentially by the terminal 32 and provided to the message transmitters 38 for transmission as selective call signals therefrom.

Selective call signals transmitted from the messaging system 10 are received by the combination radio/telephone transceiver 40 (hereinafter referred to as the "radio/telephone 40"). The radio/telephone 40, which can be, for instance, a CT-2 cordless telephone transceiver, receives the selective call signals and can then couple to the PSTN 20 via the radio telephone system 15 for communication therewith.

In accordance with the preferred embodiment of the present invention, the radio/telephone 40 receives selective call signals broadcast by the messaging system 10 via the message transmitters 38. If a flagged message is received by the radio/telephone 40, a cordless telephone link is established between the radio/telephone 40 and the cordless telephone system 15.

A call point transceiver 50, comprising a receiver portion 51 and a transmitter portion 52, receives the acknowledgment signal from the radio/telephone 40 along with information identifying an access number for accessing the messaging system 10 via the PSTN 20. The acknowledgment signal and the access information are provided to a call point controller 53 which utilizes the access information to call up the messaging system 10 via a telephone network interface 54 of the cordless telephone call point station 15. Once the call is established between the call point controller 53 and the terminal 32 via path 23 through the PSTN 20, the acknowledgment signal indicating "message received" is provided to the terminal 32. The terminal 32, in response to reception of the acknowledgment signal, can generate a "message received" response signal that is returned to the message originator at the message entry device 25. This response signal to the message originator can occur while the caller is holding on the input telephone line at the telephone network interface 30 or can be directed to a selective call receiver or other communication device that is capable of receiving the response signal.

Alternatively, the acknowledgment signal can indicate the type of message that was received (i.e. a voice, numeric or alphanumeric message), the time the message was received, whether or not the message was received error free, or a personalized acknowledgment signal. The selective call terminal 32 can provide the additional information received to the message originator. In addition, the acknowledgment signal could also be used by the terminal 32 to initiate retransmission of a message that was received with errors.

Thus, in accordance with the present invention, the messaging system 10 need not have dedicated air time or a dedicated channel to receive acknowledgment signals from radio receivers and transceivers. The combination radio/telephone 40 utilizes a cordless telephone link to provide an acknowledgment signal to the messaging system 10 for real time confirmation to a message originator that a message was received.

Figure 2:
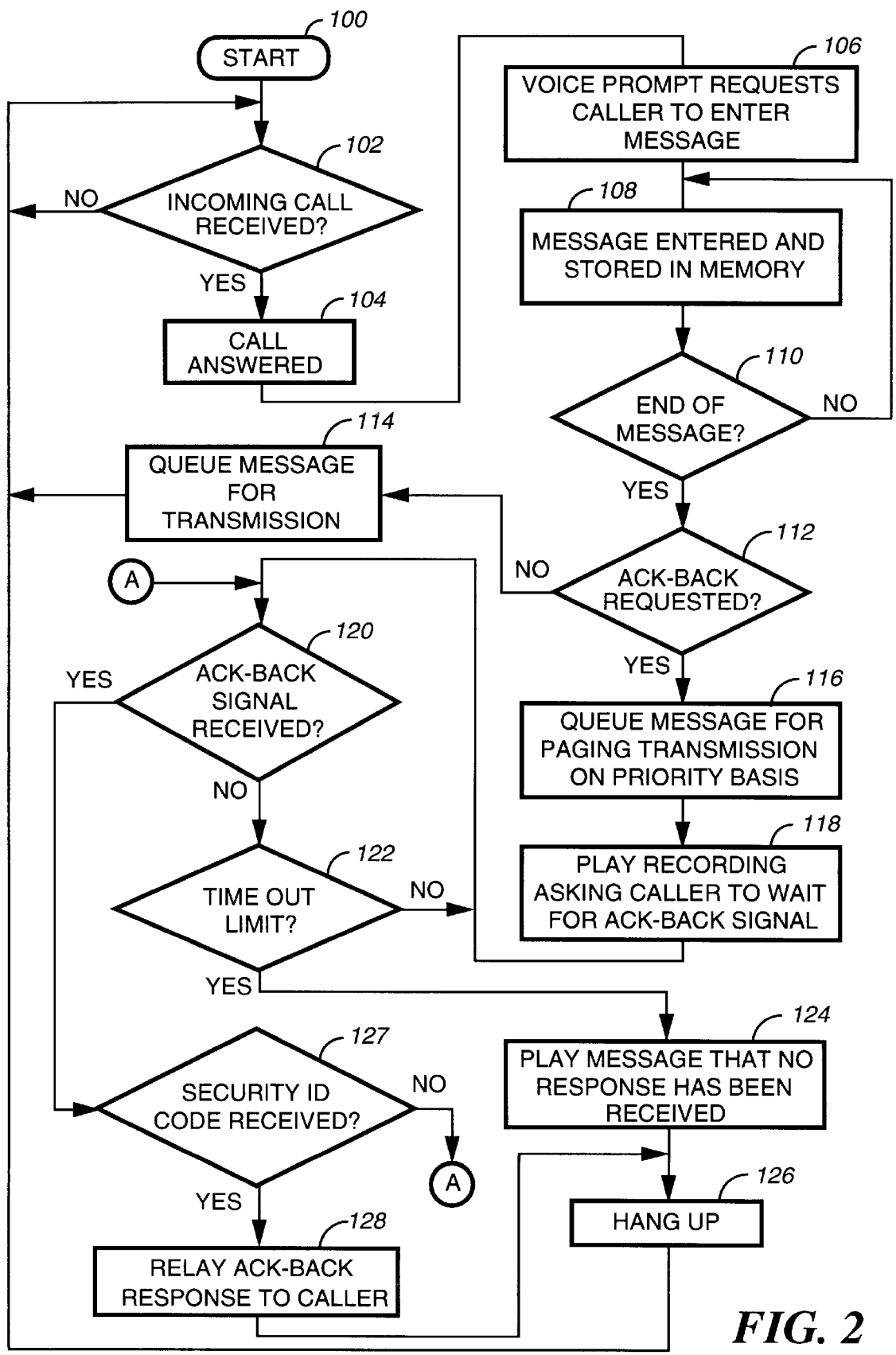
FIG. 2 is a flow diagram of the operation of the selective call terminal in the combination selective call messaging system and cordless telephone system of FIG. 1 in accordance with the preferred embodiment of the present invention.

Referring next to FIG. 2, a flowchart of the operation of the call reception routine of the terminal 32 (FIG. 1) begins upon the messaging system 10 being put into service, at step 100. Processing then awaits, at step 102, reception of an incoming call from a message originator. When an incoming call is received, at step 102, via the telephone network interface 30 (FIG. 1), the call is answered, at step 104, and the terminal 32 provides a voice prompt, at step 106, requesting the caller (message originator) to enter the message via the message entry device 25 (FIG. 1). As the message is entered, it is stored, at step 108, in a buffer memory 44 of the terminal 32 until the end of the message is detected, at step 110. When the end of the message is detected, at step 110, it is determined whether an ack-back signal is requested, at step 112. If no ack-back signal is requested, at step 112, the message is recalled from the temporary message memory 44 by the terminal 32 and placed in the message queue 36 such that the message is queued for transmission, at step 114. Processing then returns to await the next incoming call received, at step 102.

If ack-back signaling is requested, at step 112, the message is recalled from the message memory 44 and provided to the message system queue 36 (FIG. 1) such that the message is queued for transmission on a priority basis, at step 116. A recording is then played, at step 118, to the caller asking the caller to wait for an acknowledgment (ack-back) signal. Processing then awaits for the ack-back signal to be received, at step 120, or for the time out limit to be reached, at step 122. The time out limit is a predetermined time during which the system will keep the caller on the line to await reception of an ack-back signal. When a time out limit is reached, at step 122, a message is played to the caller that no response has been received, at step 124, the terminal 32 hangs up, at step 126, and processing returns to await the next incoming call received, at step 102.

If an ack-back signal is received, at step 120, within the time out limit, the ack-back signal is examined to see if a predetermined security identification (ID) code, is received, at step 127. If the security ID code is not received with the ack-back signal, at step 127, processing returns to await reception of another ack-back signal, at step 120, or time out, at step 122. The security ID code prevents falsing by verifying that the ack-back signal originated in response to the caller's message. It is desirable that a hospital, for example, receives a verified acknowledgment that a doctor has been paged. If the security ID code is detected, at step 127, the ack-back response, which can be either a standard message or a message generated by the receiver user, is relayed to the caller, at step 128. The terminal 32 then hangs up, at step 126, and processing returns to await reception of the next incoming call, at step 102.

Figure 3:
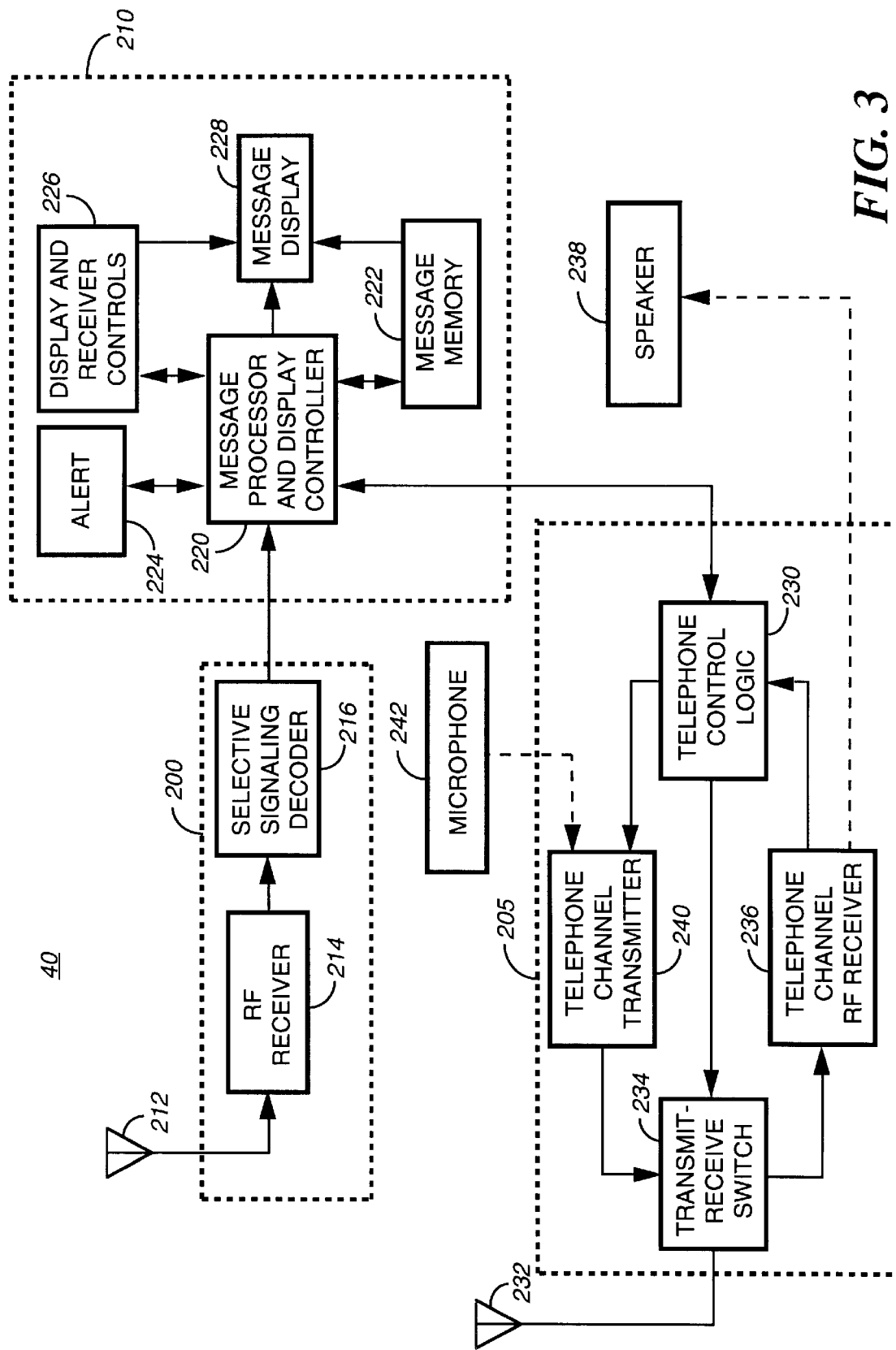
FIG. 3 is a block diagram of the combination radio/telephone transceiver included within the combination selective call messaging system and cordless telephone system of FIG. 1 in accordance with the preferred embodiment of the present invention.

Referring to FIG. 3, the radio/telephone 40 according to the preferred embodiment of the present invention comprises a radio receiver section 200, a cordless telephone transceiver section 205, and a message and display controller section 210. The radio receiver section 200 includes an antenna 212 for receiving selective call signals, a radio frequency (RF) receiver 214 coupled to the antenna 212 for demodulating the selective call signals, and a selective signaling decoder 216 for decoding the demodulated signal to recover any messages corresponding to the address assigned to the radio/telephone 40. Preferably, the radio receiver section 200 decodes selective call signals having an identification signal, i.e., a unique address, recognized by and associated with the radio/telephone 40. Messages corresponding to addresses that do not match that assigned to the radio/telephone 40 are not decoded. Alternatively, if any messages have been decoded prior to determining that they are not intended for reception by the radio/telephone, they are then discarded.

The decoded message is provided to a message processor and display controller 220 for processing thereby. In accordance with conventional messaging operations, the decoded message is stored in a message memory 222, and the user (subscriber) is alerted via an alert device 224 that a message has been received. The user can activate display and receiver controls 226 to retrieve the message from the message memory 222 and display the message on a message display 228. The controls 226 can manipulate the message display 228 or alter receiving parameters in a manner well known to those skilled in the art.

In accordance with the present invention, certain paging address codes or "flag" signals appended to a message cause the message processor 220 to initiate a telephone call via the cordless telephone transceiver section 205 when the unit is within range of a cordless telephone call point station 15 (FIG. 1). Therefore, when the alert signal is generated, the alert device 224 alerts the user that a message has been received. Depending on the desired operation, the fact that a return acknowledge back signal has been requested can be indicated to the user so that the user can initiate the response, or the return acknowledgment signal can be automatically generated. The acknowledgment signal is generated by activating the cordless telephone transceiver section 205 of the combination radio/telephone transceiver 40.

Operation of the cordless telephone section 205 is controlled by a telephone control logic device 230. An antenna 232 is utilized for transmitting and receiving signals for conventional transceiver operation. The antenna 232 is coupled to a transmit-receive switch 234 that operates under the control of the telephone control logic 230. The transmit-receive switch 234 in one position couples the antenna 232 to a telephone channel RF receiver 236 for processing received RF signals and providing the signals to the telephone control logic 230. In a second position, the transmit-receive switch 234 couples the antenna 232 to a telephone channel transmitter 240 which processes signals received from the telephone control logic 230 for transmittal as an RF signal from the antenna 232.

Also, a speaker 238 can be coupled to the receiver 236, and a microphone 242 can be coupled to the transmitter 240 for conventional cordless telephone operation. In this embodiment, the receiver 236 would provide audio portions of the signals to the speaker 238 and digital portions of the signals to the telephone control logic 230. The transmitter 240 would process audio signals, such as user audio inputs, received from the microphone 242 and digital signals received from the telephone control logic 230 for transmission from the antenna 232. In addition, a microphone 242 could allow a user to provide a personalized acknowledgment response to a message originator.

In accordance with the present invention, when the cordless telephone transceiver section 205 is activated in an "acknowledge" mode, the receiver 236 searches for a signal from a cordless telephone call point station 15 (FIG. 1). When the receiver 236 determines that the radio/telephone 40 is within range of a call point station 15, the telephone control logic 230 activates the transmitter 240 to place a call through the call point station 15 to the selective call terminal 32 (FIG. 1). When the terminal 32 answers the acknowledgment call, the processor 220 provides a special code thereto that identifies the specific radio/telephone 40 that is calling and a "message received" acknowledgment signal.

The acknowledgment signal can optionally indicate the type of message that was received (i.e. a voice, numeric or alphanumeric message), the time the message was received, whether or not the message was received error free, or a personalized acknowledgment signal. In addition, the acknowledgment signal could also be used by the terminal 32 to request retransmission of a message that was received with errors. For instance, when the number of errors is greater than a predetermined number of errors, retransmission can be requested.

Figure 4:
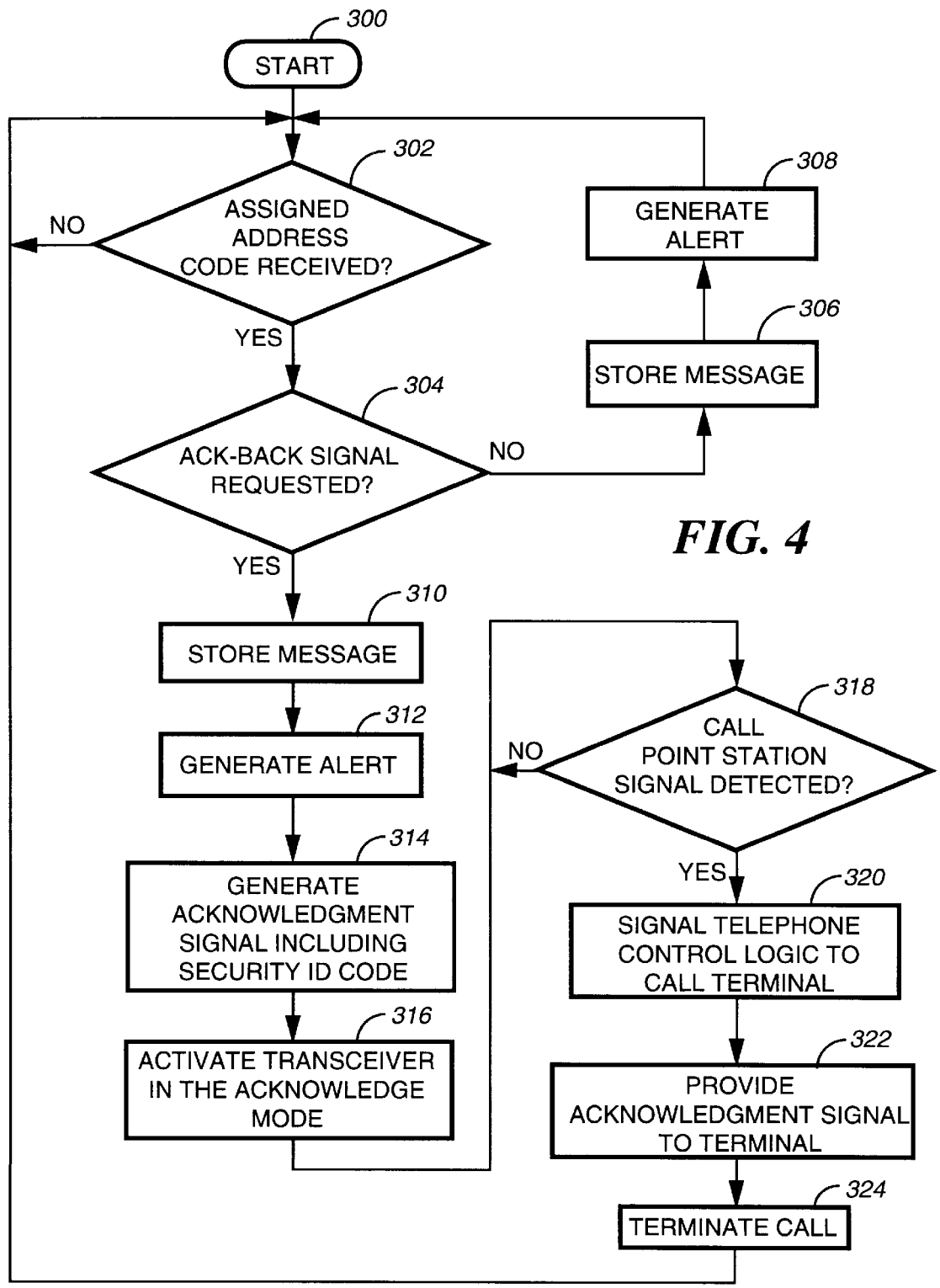
FIG. 4 is a flow diagram of the operation of the message processor in the combination radio/telephone transceiver of FIG. 3 in accordance with the preferred embodiment of the present invention.
Figure 5:
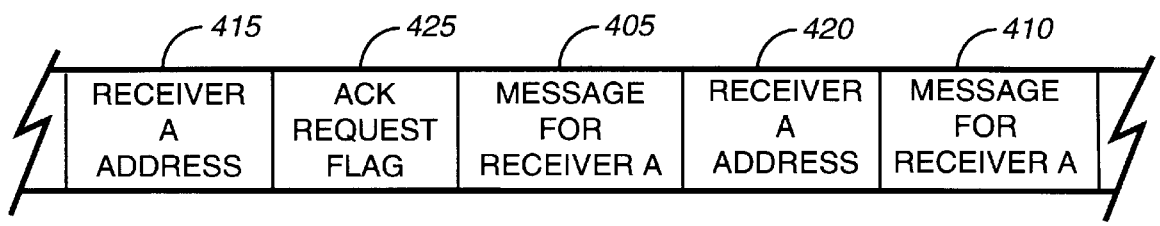
FIG. 5 is a signal diagram of a selective call signal provided within the combination selective call messaging system and cordless telephone system of FIG. 1 in accordance with the present invention.

Referring next to FIG. 4 in conjunction with FIG. 5, the operation of the message processor 220 in accordance with the preferred embodiment of the present invention starts, at step 300, upon powering up of the combination radio/telephone 40. Processing of messages awaits reception of a message 405, 410 (FIG. 5) having an address 415, 420 (FIG. 5) assigned to the radio/telephone 40. The address 415, 420 can, for instance, be uniquely assigned to the radio/telephone 40. When, at step 302, the address included in the selective call signal is not associated with the radio/telephone 40, messages within the signal are not decoded and processed by the radio/telephone 40. Instead, messages not associated with an address assigned to the radio/telephone 40 are discarded if any portions thereof have been received. Additionally, messages not associated with an address assigned to the radio/telephone 40 are not stored or acknowledged by the radio/telephone 40.

When an assigned address code is received, at step 302, processing determines if an acknowledgment (ack-back) signal is requested, at step 304. If the message is a flagged message, having been flagged by the ack-back message flagger 42 (FIG. 1) with, for instance, an acknowledge request flag 425 (FIG. 5) appended to the address code 415, an acknowledgment signal is requested, at step 304. Also, a predetermined "ack" address, different from the radio/telephone address also included in the signal, could indicate that an acknowledgment signal is requested, at step 304.

If, at step 304, an incoming message intended for reception by the radio/telephone 40 is not flagged with a distinct ack-back flag or an ack address, e.g., when an address code 420 (FIG. 5) and a message 410 are received in the absence of an acknowledge request flag, the message is stored, at step 306, for subsequent retrieval by the user in accordance with conventional pager operation. Also, an alert is generated, at step 308, to notify the user that a message has been received and stored. However, no acknowledgment is generated by the radio/telephone 40 to acknowledge message reception, since the message originator did not flag the message. Processing then returns to await reception, at step 302, of a next message having an assigned address code.

If an acknowledgment signal is requested, at step 304, the message is stored, at step 310, and an alert is generated, at step 312. In accordance with the present invention, the acknowledgment signal response is generated, at step 314, including a security ID code assigned to the radio/telephone 40. The acknowledgment signal can be automatically generated or can allow for personalization by the user through activation of the controls 226, via user input signals, or entry of a voice message via the microphone 242 (FIG. 3). The acknowledgment signal, in either case, can be generated by a signal generator implemented, for instance, as software included in the message processor 220. In addition, a particular response requesting retransmission could be generated by the processor 220 in response to detection of sufficient errors in the received message to indicate that the message may not have been correctly received. The security ID code authenticates the acknowledgment signal, verifying that the acknowledgment signal originated from the radio/telephone 40.

After generation of the acknowledgment signal, at step 314, the processor 220 activates the cordless telephone transceiver section 205 in the acknowledge mode, at step 316. Upon activation of the transceiver section 205, the receiver 236 searches for a call point station, at step 318. When a call point station signal is detected, at step 318, a cordless telephone link is established between the transceiver section 205 and a cordless telephone system call point transceiver at the call point station. The processor 220 signals the telephone control logic 230 to call up, at step 320, the selective call terminal 32 (FIG. 1). When the transceiver section 205 is coupled to the terminal 32 via the cordless telephone link, the generated acknowledgment signal is provided, at step 322, to the terminal 32. The call is then terminated, at step 324, and processing returns to await the next message received having an assigned address code, at step 302. Therefore, in accordance with the present invention, selective call messages transmitted from a terminal 32 and received by the radio/telephone 40 can be acknowledged via a cordless telephone link between a transceiver coupled to the radio/telephone 40 and the terminal 32.

As a result, air time, during which selective call messages would normally be transmitted, is not required to be reserved for acknowledgment signals. Furthermore, a channel need not be devoted to transmission of acknowledgment signals since the PSTN 20 (FIG. 1) is used. The communication system including the radio/telephone 40 according to the present invention therefore provides a more efficient and less expensive alternative to conventional ack-back signaling systems.

Referring to FIG. 5, a selective call signal 450 depicts the transmission of selective call messages 405, 410 to a combination radio/telephone transceiver 40, such as receiver A, within the messaging system 10. When messages are provided to receiver A, the signal 450 includes, for each message 405, 410, an address 415, 420 associated with receiver A. Additionally, when the message originator has requested an acknowledgment of a message, such as message 405, the message 405 can be flagged with an acknowledgment request flag 425 distinct from the address 415. The acknowledgment request flag 425 can be, for instance, another address that is different from and appended to the address assigned to receiver A. In this manner, the radio/telephone 40 can receive both messages that require an acknowledgment and messages that do not.

In summary, the radio/telephone according to the present invention examines a selective call signal to determine whether its assigned address is recognized. If not, no messages in the signal are decoded, stored, or further processed, such as by acknowledgment. When the assigned address is found, a message associated therewith is decoded and stored, and further conventional processing occurs. Once a message intended for reception by the radio/telephone (as indicated by the presence of the assigned address) is found, the radio/telephone further examines the signal to determine whether the message has been flagged for acknowledgment, such as by appending a predetermined ack-back flag or a predetermined ack address to the address assigned to the radio/telephone. When no acknowledgment is requested, i.e., when the message has not been flagged for acknowledgment, the radio/telephone does not acknowledge reception of the message. On the other hand, when the message originator has requested acknowledgment, as indicated by the presence of an ack-back flag or ack address, the radio/telephone acknowledges reception of the message.

By now it should be appreciated that there has been provided an ack-back signaling system that does not reduce air time available for transmission of selective call messages and that does not require a devoted communications path.

We claim:

1. A combination radio/telephone for receiving a selective call signal from a terminal, the combination radio/telephone comprising:

a decoder for decoding the selective call signal to recover a message intended for reception by the combination radio/telephone, wherein messages corresponding to addresses that are not associated with the combination radio/telephone are not decoded;

determining means for determining whether an acknowledge back signal is requested for the message;

radio telephone means coupled to the determining means and the decoder for coupling to a radio telephone system; and control means coupled to the radio telephone means for coupling the radio telephone means to the radio telephone system to communicate the acknowledge back signal via the radio telephone system to the terminal in response to the determining means determining that the message requests the acknowledge back signal, and for storing and processing the message without acknowledgment in response to the determining means determining that the message does not request the acknowledge back signal.

2. The combination radio/telephone of claim 1, wherein the determining means comprises:

processing means for detecting and counting a number of errors in the message; and retransmission requesting means for determining that an acknowledgment signal requesting retransmission of the message is required in response to the number of errors being greater than a predetermined number, wherein the acknowledgment signal is transmitted by the combination radio/telephone.

3. The combination radio/telephone of claim 1, wherein the control means couples the radio telephone means to the radio telephone system to communicate the acknowledge back signal and an identification signal to the terminal in response to the determining means determining that the message requests the acknowledge back signal, wherein the identification signal uniquely identifies the combination radio/telephone.

4. The combination radio/telephone of claim 1, wherein the control means couples the radio telephone means to the radio telephone system to communicate the acknowledge back signal, an identification signal, and a security identification code to the terminal in response to the determining means determining that the message requests the acknowledge back signal.

5. The combination radio/telephone of claim 1, further comprising audio input means coupled to the radio telephone means for receiving user audio input thereto, wherein the control means couples the radio telephone means to the radio telephone system to communicate the user audio input to the terminal in response to the determining means determining that the message requests the acknowledge back signal.

6. The combination radio/telephone of claim 1, further comprising user input means coupled to the control means for providing user input signals thereto, wherein the control means couples the radio telephone means to the radio telephone system to communicate the user input signals to the terminal in response to the determining means determining that the message requests the acknowledge back signal.

7. The combination radio/telephone of claim 1, wherein the radio telephone means comprises cordless telephone means for coupling to a cordless telephone system call point transceiver for communicating thereby, and wherein the control means couples the cordless telephone means to the cordless telephone system call point transceiver to communicate the acknowledge back signal to the terminal in response to the determining means determining that the message requests the acknowledge back signal.

8. The combination radio/telephone of claim 1, wherein the selective call signal comprises the message and an address associated with the combination radio/telephone, the address indicating that the message is intended for reception by the combination radio/telephone, and wherein the selective call signal further comprises, when the acknowledge back signal is requested by a message originator, an acknowledgment request flag that is distinct from the address.

9. A selective call receiver within a combination radio/telephone, comprising:

a radio frequency (RF) receiver for receiving selective call signals transmitted from a terminal;

a decoder coupled to the RF receiver for decoding the selective call signals to recover a message intended for reception by the selective call receiver;

a message processor for determining whether the message is a flagged message requesting an acknowledge back; and a controller for coupling a telephone section of the combination radio/telephone to the terminal via a radio telephone system and for transmitting an acknowledge back signal to the terminal in response to the message processor determining that the message is a flagged message, wherein the controller stores and processes the message without acknowledgment in response to the message processor determining that the message is not a flagged message.

10. The selective call receiver of claim 9, wherein the selective call signals comprise the message, an address that is associated with the selective call receiver and that indicates that the message is intended for reception by the selective call receiver, and, when a message originator has requested the acknowledge back, an acknowledge request flag distinct from the address.

11. The selective call receiver of claim 9, wherein the controller comprises:

a signal generator for generating an acknowledgment signal in response to the message processor determining that the message is a flagged message requesting an acknowledge back; and a telephone transceiver for coupling to the radio telephone system and transmitting the acknowledgment signal to the terminal via the radio telephone system in response to the message processor determining that the message is a flagged message requesting an acknowledge back.

12. The selective call receiver of claim 9, further comprising:

a memory for storing the message when it is intended for reception by the selective call receiver, regardless of whether the message is a flagged message; and an alert device for alerting a user that the message has been received, wherein the controller comprises:

means for storing the message in the memory; and means for activating the alert device in response to the memory storing the message.

13. The selective call receiver of claim 10, wherein the controller comprises:

detecting means for detecting a number of errors in the message; and retransmission means for coupling to the radio telephone system and requesting retransmission in response to the detecting means detecting a number of errors greater than a predetermined number.

14. The selective call receiver of claim 11, wherein the radio telephone transceiver provides an identification code and the acknowledgment signal to the terminal, wherein the identification code identifies the selective call receiver.

15. The selective call receiver of claim 11, wherein the telephone transceiver provides a security identification code and the acknowledgment signal to the terminal, wherein the security identification code authenticates the acknowledgment signal.

16. The selective call receiver of claim 11, wherein the telephone transceiver comprises a cordless telephone transceiver for coupling to a cordless telephone system call point transceiver and transmitting the acknowledgment signal to the terminal via the cordless telephone system call point transceiver in response to the message processor determining that the message is a flagged message requesting an acknowledgment.

17. A messaging system for transmitting a selective call signal, comprising:

a selective call terminal for receiving a message and determining, from data entered by a message originator, whether message reception is to be acknowledged, the selective call terminal comprising:

a flagger for generating an acknowledgment request flag in response to determining that message reception is to be acknowledged; and a transmitter coupled to the flagger for transmitting the message, an address associated with a combination radio/telephone, and, when message reception is to be acknowledged, the acknowledgment request flag, which is distinct from the address of the combination radio/telephone.

18. The messaging system of claim 17, further comprising:

the combination radio/telephone, including:

a radio frequency (RF) receiver for receiving the selective call signal transmitted from the selective call terminal;

a decoder coupled to the RF receiver for decoding the selective call signal to recover the message associated with the address of the combination radio/telephone;

a message processor for determining whether the message is a flagged message requesting an acknowledge back, as indicated by the acknowledgment request flag; and a controller for coupling a telephone section of the combination radio/telephone to the selective call terminal via a radio telephone system and for transmitting an acknowledge back signal to the selective call terminal in response to the message processor determining that the message is a flagged message, wherein the controller stores and processes the message without acknowledgment in response to the message processor determining that the message is not a flagged message.

19. A method for selectively generating acknowledgment signals in a combination radio/telephone including a receiver for receiving a selective call signal and a controller for transmitting signals, the method comprising the steps of:

decoding the selective call signal to recover a message intended for reception by the combination radio/telephone;

determining whether the selective call signal further includes an acknowledgment request flag that is associated with the message and that requests acknowledgment of message reception by the combination radio/telephone;

storing and processing the message without transmitting an acknowledgment signal in response to determining that no acknowledgment request flag is associated with the message; and transmitting the acknowledgment signal to indicate that the combination radio/telephone has received the message in response to determining that the acknowledgment request flag associated with the message is included in the selective call signal.

\* \* \* \* \*